(12) United States Patent
Schneider et al.

(10) Patent No.: US 11,030,369 B2
(45) Date of Patent: Jun. 8, 2021

(54) SUPERCONDUCTING CIRCUIT WITH VIRTUAL TIMING ELEMENTS AND RELATED METHODS

(71) Applicant: Microsoft Technology Licensing, LLC, Redmond, WA (US)

(72) Inventors: Janet L. Schneider, Bellevue, WA (US); Kenneth Reneris, Kirkland, WA (US); Mark G. Kupferschmidt, Bothell, WA (US); Brian L. Koehler, Woodinville, WA (US); Adam J. Muff, Woodinville, WA (US); Alexander L. Braun, Baltimore, MD (US); Alison Ii, Elkridge, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/559,874

(22) Filed: Sep. 4, 2019

(65) Prior Publication Data

US 2021/0064718 A1     Mar. 4, 2021

(51) Int. Cl.
*G06F 30/30* (2020.01)
*G06F 30/3323* (2020.01)
*G06F 30/3312* (2020.01)
*G06F 30/327* (2020.01)
*G06F 30/337* (2020.01)
(Continued)

(52) U.S. Cl.
CPC ........ *G06F 30/3323* (2020.01); *G06F 30/327* (2020.01); *G06F 30/337* (2020.01);
(Continued)

(58) Field of Classification Search
None
See application file for complete search history.

(56) References Cited

U.S. PATENT DOCUMENTS 8,813,001 B2 *   8/2014   Zhou ..................... G06F 30/327
                                                        716/100
9,652,571 B2 *   5/2017   Shauck ................. G06F 30/327
(Continued)

OTHER PUBLICATIONS

Fourie, et al., "ColdFlux Superconducting EDA and TCAD Tools Project: Overview and Progress", In Journal of the IEEE Transactions on Applied Superconductivity vol. 29, Issue 5, Jan. 10, 2019, 7 Pages.

(Continued)

*Primary Examiner* — Leigh M Garbowski
(74) *Attorney, Agent, or Firm* — Ranjeev Singh; Singh Law, PLLC

(57) ABSTRACT

Superconducting circuit with virtual timing elements and related methods are described. A method includes specifying a superconducting circuit portion including a timing path comprising: (1) at least one logic gate to be implemented using Josephson junctions, (2) a first virtual timing element for defining a synchronization point along the timing path, and (3) a second virtual timing element for adding latency to the timing path. The method further includes synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the timing path, but the second flip-flop is treated as being movable in relation to the at least one logic gate along the timing path.

20 Claims, 8 Drawing Sheets

(51) Int. Cl.
　　　G06F 1/12　　　　(2006.01)
　　　H03K 3/38　　　　(2006.01)
　　　G06F 30/398　　　(2020.01)
　　　G06F 119/12　　　(2020.01)
　　　G06F 30/392　　　(2020.01)
　　　G06F 30/396　　　(2020.01)
　　　G06F 119/16　　　(2020.01)

(52) U.S. Cl.
　　　CPC .......... *G06F 30/3312* (2020.01); *G06F 1/12* (2013.01); *G06F 30/30* (2020.01); *G06F 30/392* (2020.01); *G06F 30/396* (2020.01); *G06F 30/398* (2020.01); *G06F 2119/12* (2020.01); *G06F 2119/16* (2020.01); *H03K 3/38* (2013.01)

(56) References Cited

U.S. PATENT DOCUMENTS

| | | | |
|---|---|---|---|
| 10,061,883 B2 * | 8/2018 | Shauck | G06F 30/398 |
| 10,355,681 B1 * | 7/2019 | Inamdar | H03K 5/131 |
| 10,769,344 B1 * | 9/2020 | Schneider | H03K 19/1952 |
| 2019/0391807 A1 * | 12/2019 | Inagaki | G06F 9/223 |

OTHER PUBLICATIONS

Katam, et al., "Logic Optimization, Complex Cell Design, and Refining of Single Flux Quantum Circuits", In Journal of the IEEE Transactions on Applied Superconductivity vol. 28, Issue 7, Jul. 17, 2018, 9 Pages.

Pasandi, et al., "PBMap: A Path Balancing Technology Mapping Algorithm for Single Flux Quantum Logic Circuits", In Journal of the IEEE Transactions on Applied Superconductivity vol. 29, Issue 4, Nov. 9, 2018, 14 Pages.

"International Search Report and Written Opinion Issued in PCT Application No. PCT/US2020/037999", dated Dec. 9, 2020, 21 Pages.

* cited by examiner

SUPERCONDUCTING CIRCUIT WITH VIRTUAL TIMING ELEMENTS AND RELATED METHODS

BACKGROUND

Semiconductor based integrated circuits used in electronic devices, such as digital processors, include digital circuits based on complimentary metal-oxide semiconductor (CMOS) technology. CMOS technology, however, is reaching its limits in terms of the device size. In addition, power consumption at high clock speeds by digital circuits based on the CMOS technology has increasingly become a limiting factor in high performance digital circuits and systems. As an example, servers in a data center are increasingly consuming large amounts of power. The consumption of power is partly the result of power loss from the dissipation of energy even when the CMOS circuits are inactive. This is because even when such circuits are inactive, and are not consuming any dynamic power, they still consume power because of the need to maintain the state of CMOS transistors.

An additional approach to the use of processors and related components, based on CMOS technology, is the use of superconducting logic-based components and devices. Superconducting logic-based circuits can also be used to process quantum information, such as qubits. Many superconducting logic circuits include Josephson junctions, which may be controlled using high speed clocks or microwave signals. Such circuits can include active transmission elements that can complicate timing design.

SUMMARY

In one aspect, the present disclosure relates to a method, implemented by a processor, including using the processor, specifying a superconducting circuit portion including at least one timing path comprising: (1) at least one logic gate to be implemented using Josephson junctions, (2) a first virtual timing element for defining a synchronization point along the at least one timing path, and (3) a second virtual timing element for adding latency to the at least one timing path. The method may further include using the processor, synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the at least one timing path, but the second flip-flop is treated as being movable in relation to the at least one logic gate along the at least one timing path.

In another aspect, the present disclosure relates to a superconducting circuit having a first input terminal, a second input terminal, an output terminal, and a clock terminal configured to receive a clock signal. The superconducting circuit may include a first timing path comprising a first active transmission element coupled between the first input terminal and a first virtual timing element. The superconducting circuit may further include a second timing path comprising a second active transmission element coupled between the second input terminal and a second virtual timing element. The superconducting circuit may further include a logic gate coupled to: (1) receive a first signal via the first input terminal and (2) receive a second signal via the second input terminal, where, based on the first signal and the second signal, the logic gate is further configured to provide an output signal. The superconducting circuit may further include a third virtual timing element coupled to receive the output signal and couple the output signal to the output terminal, where the first virtual timing element is configured to add a first latency to the first timing path and the second virtual timing element is configured to add a second latency to the second timing path, and where the third virtual timing element is configured to allow logical equivalence testing during design of the superconducting circuit.

In yet another aspect, the present disclosure relates to a method, implemented by a processor, including using the processor, specifying a superconducting circuit portion including at least one timing path comprising: (1) at least one logic gate to be implemented using Josephson junctions, (2) a first virtual timing element for defining a synchronization point along the at least one timing path, and (3) a second virtual timing element for adding latency to the at least one timing path. The method may further include using the processor, synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the at least one timing path, but the second flip-flop is treated as being movable in relation to the at least one logic gate along the at least one timing path. The method may further include using the processor, compiling the superconducting circuit portion, where the compiling comprises: (1) treating the first flip-flop as the first virtual timing element and treating the second flip-flop as the second virtual timing element, and (2) inserting active transmission elements in the at least one timing path, where each of the active transmission elements has an assigned phase selected from a plurality of phases associated with a clock signal for clocking each of active transmission elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
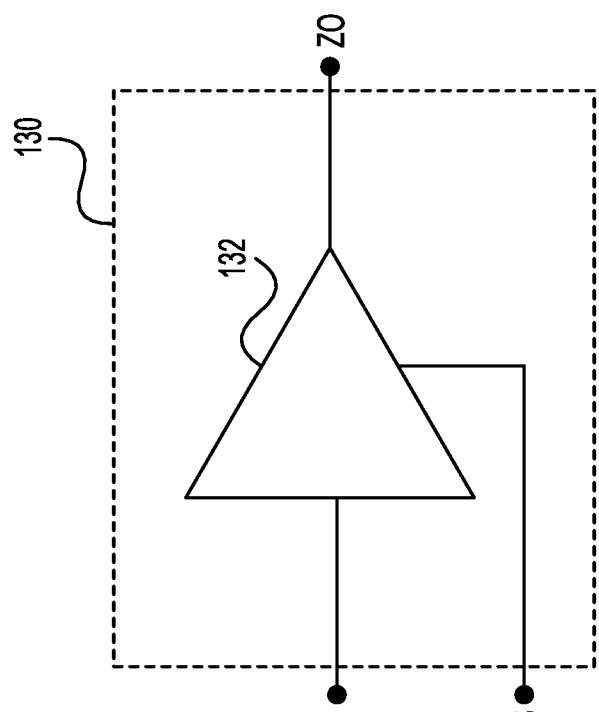
FIG. 1 is a diagram of virtual timing elements in accordance with one example.
Figure 1:
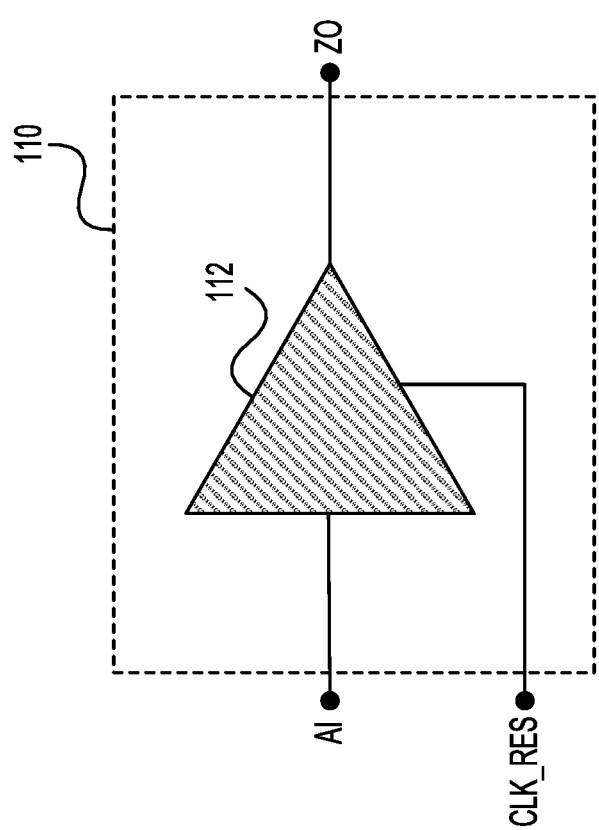

Examples described in this disclosure relate to methods for inserting virtual timing elements in a superconducting circuit design. Certain other examples relate to superconducting circuits including virtual timing elements. Superconducting circuits may use Josephson junctions to implement the functionality associated with the circuits. An exemplary Josephson junction may include two superconductors coupled via a region that impedes current. The region that impedes current may be a physical narrowing of the superconductor itself, a metal region, or a thin insulating barrier. As an example, the Superconductor-Insulator-Superconductor (SIS) type of Josephson junctions may be implemented as part of the superconducting circuits. As an example, superconductors are materials that can carry a direct electrical current (DC) in the absence of an electric field. Superconductors have a critical temperature (Tc) below which they have zero resistance. Niobium, one such superconductor, has a critical temperature (Tc) of 9.3 Kelvin degrees. At temperatures below Tc, niobium is superconductive; however, at temperatures above Tc, it behaves as a normal metal with electrical resistance, Thus, in the SIS type of Josephson junction superconductors may be niobium superconductors and insulators may be $Al_2O_3$ barriers. In SIS type of junctions, the superconducting electrons are described by a quantum mechanical wave-function. A changing phase difference in time of the phase of the superconducting electron wave-function between the two superconductors corresponds to a potential difference between the two superconductors.

Various superconducting circuits including transmission lines can be formed by coupling multiple Josephson junctions by inductors or other components, as needed. Microwave pulses can travel via these transmission lines under the control of at least one clock. The microwave pulses can be positive or negative, or a combination thereof. The microwave pulses may have a frequency of up to 10 GHz or higher. The clock may also have a frequency up to 10 GHz or higher.

In one example, the logic of the circuits may be referred to as wave pipelined logic and the digital data may be encoded using a pair of positive and negative single flux quantum (SFQ) pulses, As an example, a logical one bit may be encoded as a pair of SFQ pulses generated in the positive and negative phases of a sinusoidal clock. A logical zero bit may be encoded by the absence of positive/negative pulse pairs during a clock cycle. The positive SFQ pulse may arrive during the positive part of the clock, whereas the negative pulse may arrive during the negative part of the clock. The positive SFQ pulse may arrive before the positive part of the clock, but it will not be propagated until a positive clock arrives. Similarly, the negative SFQ pulse may arrive before the negative part of the clock, but it will not be propagated until a negative phase of the clock arrives.

The building blocks of superconducting circuits may include various types of logic gates. Example logic gates include an AND gate, an OR gate, a logical A-and-not-B (AanB) gate and a logical AND & OR (AndOr) gate. The AanB gate may have two inputs and one output (Q). An input pulse A may propagate to output Q unless an input pulse B comes first. The AndOr gate may have two inputs and two outputs (Q1 and Q2). The first input pulse, input pulse A or input pulse B goes to output Q1 and the second input pulse goes to output Q2. The logical behavior of these gates may be based on the reciprocal data encoding mentioned earlier.

Certain examples in this disclosure relate to describing and implementing a wave pipelined (WPL) superconducting circuit design in a hardware description language, such as register transfer language (RTL). Example solutions include a methodology that provides circuit designers with a set of primitives to implement WPL superconducting circuit designs. In WPL superconducting circuit designs, each phase can be considered a pipeline stage. Traditional RTL design tools do not permit designers to efficiently pipeline fully phased logic in RTL. In addition, coding logic to fully describe phase crossings is not efficient for complex designs. Also, prior WPL methodologies may not describe phasing in RTL, leading to inconsistencies in RTL simulation vs. gate simulation. Certain examples further provide for a method to specify feedback loops in a WPL superconducting circuit designs. Advantageously, the methods and systems described in this disclosure allow a designer to specify latency on a path-by-path basis and allow the RTL simulation to be cycle accurate. In addition, the designer can describe phase information in a way that allows other automated tools to optimize superconducting circuit design boundaries efficiently, FIG. 1 is a diagram of virtual timing elements 100 in accordance with one example. In this example, one type of a virtual timing element is an anchor cell 110 and another type of virtual timing element is a retime cell 130. Anchor cell 110 may include an anchor component 112 and may have an input terminal AI, an output terminal ZO, and a clock terminal CLK_RES. A resonator clock, e.g., an alternating current (AC) signal, may be coupled to the clock terminal CLK_RES. In one example, anchor cell 110 provides a means of specifying a fixed boundary in a logic cone. In this example, automated design optimization tools are not allowed to retime or cross this boundary. In one example, retime cell 130 specifies cycle boundaries in RTL. Retime cell 130 may include a retime component 132 and may have an input terminal AI, an output terminal ZO, and a clock terminal CLK_RES. A resonator clock, e.g., an alternating current (AC) signal, may be coupled to the clock terminal CLK_RES. Retime cells can move through the logic cone through automated optimization, aka retime. Retimes are not allowed to cross anchor points. Retimes are placed directly preceding the cell where the phase transition to zero resides. Each of anchor cell 110 and retime cell 130 may be represented by an appropriate data structure during the design phase. These virtual elements may also be included as circuit components in a superconducting logic circuit designed using the methods and systems described in the present disclosure.

Figure 2:
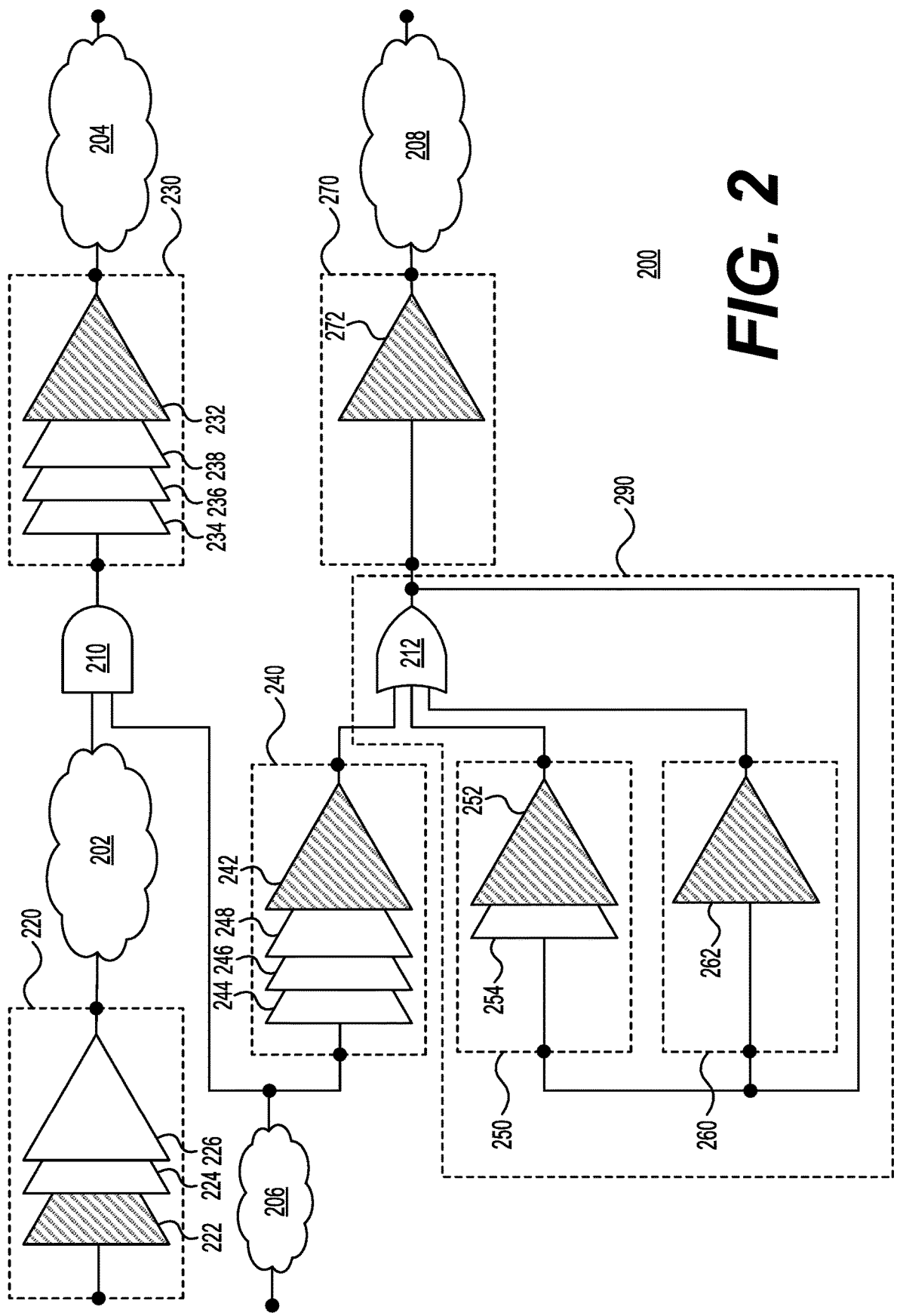
FIG. 2 is a diagram showing an example superconducting circuit design.

FIG. 2 shows a diagram of an example superconducting circuit design 200. In this example, superconducting circuit design 200 may be designed using a hardware description language (e.g., RTL) in accordance with one example, Superconducting circuit design 200 may include combinatorial logic, logic gates, and wave pipelined (WPL) stages. As an example, FIG. 2 shows superconducting circuit design 200 having four combinatorial logic blocks 202, 204, 206, and 208. Superconducting circuit design 200 may further include logic gates 210 and 212. In this example, superconducting circuit design 200 may include several WPL stages, including WPL stage 220, 230, 240, 250, 260, and 270. In this example, each WPL stage is a design component incorporated into the superconducting circuit design tool to allow a designer to describe pipelining and cycle information into the design tool flow. Each WPL stage may include one or more virtual timing elements, including either an anchor cell (e.g., anchor cell 110 of FIG. 1), a retime cell (e.g., retime cell 130 of FIG. 1), or both. In this example superconducting circuit design 200, WPL stage 220 includes an anchor cell 222, a retime cell 224, and another retime cell 226. In this example, anchor cell 222 is placed in front of the retime cells. WPL stage 220 is coupled to combinatorial logic 202 in the manner shown in FIG. 2. Thus, in this example, WPL stage 220 is coupled to an input terminal associated with combinatorial logic 202. WPL stage 230 includes an anchor cell 232, a retime cell 234, another retime cell 236, and a yet another retime cell 238. In this example, anchor cell 232 is placed at the end of retime cells. WPL stage 230 is coupled to combinatorial logic 204 and logic gate 210 in the manner shown in FIG. 2. Thus, in this example, WPL stage 230 is coupled to an output terminal of logic gate 210 and an input terminal of combinatorial logic 204. Logic gate 210 is an AND gate in this example.

With continued reference to FIG. 2, WPL stage 240 includes an anchor cell 242, a retime cell 244, another retime cell 246, and a yet another retime cell 248, In this example, anchor cell 242 is placed at the end of retime cells. WPL stage 240 is coupled to combinatorial logic 206 and logic gate 212 in the manner shown in FIG. 2. Thus, in this example, WPL stage 240 is coupled to an output terminal associated with combinatorial logic 206 and an input terminal associated with logic gate 212. Logic gate 212 is an OR gate in this example. WPL stage 250 may include an anchor cell 252 and a retime cell 254. WPL stage 250 is coupled to logic gate 212 in the manner shown in FIG. 2. Thus, in this example, WPL stage 250 is coupled to an input terminal associated with logic gate 212 and an output terminal associated with logic gate 212. The output terminal of logic gate 212 provides input to WPL stage 250 forming a feedback loop. WPL stage 260 may include an anchor cell 262. WPL stage 260 is coupled to logic gate 212 in the manner shown in FIG. 2. Thus, in this example, WPL stage 260 is coupled to an input terminal associated with logic gate 212 and an output terminal associated with logic gate 212. The output terminal of logic gate 212 provides input to WPL stage 260 forming a feedback loop. Thus, in this superconducting circuit design 200 feedback loops 290 are incorporated.

Still referring to FIG. 2, superconducting circuit design 200 may further include WPL stage 270, which may include an anchor cell 272. WPL stage 270 may be coupled to an output terminal of logic gate 212 and input terminal of combinatorial logic 208. Using a design tool, a designer may instantiate anchor cells (e.g., any of the anchor cells shown in FIG. 2) and retime cells (e.g., any of the retime cells shown in FIG. 2) to define the number of cycles in the design. As an example, in an RTL design tool, anchor cells are intended to break the loops and provide fixed points in the netlist that relate directly to the RTL. Retime cells are intended to provide flexibility in designing logic that may span multiple cycles, where the precise cycle crossings should be left up to the tool. Together, they provide a method to fully specify a WPL design in a hardware description language, such as RTL, and provide the designer a method to trade off verboseness with performance. Thus, in one example of superconducting circuit design 200, an anchor cell may define a cycle boundary. Assuming the resonator clock corresponding to the circuit being timed is an AC clock (e.g., a sinusoidal clock) with four phases (0 degrees, 90 degrees, 180 degrees, and 270 degrees), the cycle boundary may correspond to a zero-crossing. As an example, the cycle boundary may correspond to a zero-crossing that includes a crossing of the resonator clock signal from a phase of 270 degrees to 0 degrees. In other examples, the cycle boundary may correspond to other points along the clock cycle. The number of retime cells in each WPL stage may be selected based on a design criterion. One example design criterion may relate to the delays introduced in the timing path by various combinatorial logic blocks and/or gate and the corresponding need to re-align the signals propagating along the timing paths. Although FIG. 2 shows a specific number and type of components arranged in a certain manner, superconducting circuit design 200 may include additional or fewer components that may be of other types and that may be arranged differently. In addition, although not shown in FIG. 2, the anchor cells and the retime cells receive clock signals via an associated clock terminal (e.g., CLK_RES terminal described earlier with respect to FIG. 1).

During the circuit design phase, there may be several stages. As an example, the stages may include: (1) RTL simulation, (2) gate simulation, (3) synthesis, (4) data path compiler, (5) logical equivalence checking (LEC), (6) pulse timing, and (7) WPL stage timing. In certain examples, during the RTL simulation stage, both the anchor cell and the retime cell may behave like a flip-flop. This may allow the verification to correctly model the staging of logic from an anchor cell to another anchor cell, even if the retime cells are optimized during the flow. Tables 1 and 2 show the example behavior and the example pins (also referred to as terminals) associated with the anchor cells and the retime cells during the RTL simulation stage.

TABLE 1

| Anchor Property | Description |
| --- | --- |
| Behavior | always @(posedge clk_res) zo <= ai; Flop at clk_res |
| Pins | ai, zo, clk_res |

TABLE 2

| Retime Property | Description |
| --- | --- |
| Behavior | always @(posedge clk_res) zo <= ai; Flop at clk_res |
| Pins | ai, zo, clk_res |

During the gate simulation stage, both anchor cells and retime cells may be ignored by the gate simulation tool. All phase information related to the logic gates, the inverters, the Josephson transmission lines (JTLS), and other components may be embedded in the surrounding logic. Tables 3 and 4 show the example behavior and the example pins (also referred to as terminals) associated with the anchor cells and the retime cells during the gate simulation stage.

TABLE 3

| Anchor Property | Description |
| --- | --- |
| Behavior | Transparent, pass through |
| Pins | ai, zo, clk_res (clk_res unused) |

TABLE 4

| Retime Property | Description |
| --- | --- |
| Behavior | Transparent, pass through |
| Pins | ai, zo, clk_res (clk_res unused) |

During the synthesis stage; both the anchor cells and the retime cells may be treated as flip-flops. This enables early feedback on the staging pressure. In addition; the synthesis tool is not allowed to retime anchors; thus, no logic can be optimized through the cell, including instantiated JTLs. The synthesis flow is required to disallow logic retiming through the anchor cells. Synthesis tool is allowed, but not required, to retime the retime cells. Thus, the logic may be optimized through the retime cells. As a result; the retime cells are output in the netlist as placeable elements. Tables 5 and 6 show the example behavior and the example pins (also referred to as terminals) associated with the anchor cells and the retime cells during the synthesis stage.

TABLE 5

| Anchor Property | Description |
| --- | --- |
| Behavior | always @(posedge clk_res) zo <= ai; Flop at clk_res |
| Pins | ai, zo, clk_res |
| Library | Average Delay Liberty - this property is needed because this is a placeable element. |

TABLE 6

| Retime Property | Description |
| --- | --- |
| Behavior | always @(posedge clk_res) zo <= ai; Flop at clk_res |
| Pins | ai, zo, clk_res |
| Library | Average Delay Liberty - this property is needed because this is a placeable element. |

During the data path compiler (DPC) stage, anchor cells are treated as virtual timing elements. In this example, the DPC is not allowed to optimize logic across an anchor cell. DPC will fail timing if it cannot meet phase timing, or if the number of retimes needed exceeds what is specified in the RTL. In one example, anchor cells are placed directly preceding the cell where the phase transition to zero resides. In this example, the DPC will generate timing constraint files in a format that constrains all anchor-to-anchor timing arcs by traversing the arcs and determining how many retime components are present. Constraints for the anchor cells to/from input/output terminals may also be provided. During the DPC stage, the retime cells are also treated as virtual timing elements. The DPC is allowed to optimize logic through a retime cell. In this example, the DPC will fail timing if the number of retimes in a logic cone, anchor cell to anchor cell, does not match exactly the number of retimes specified in the RTL. Retime cells may be placed directly preceding the cell where the phase transition to zero resides. In this example, the DPC will fail if there is more than one path from same anchor-to-anchor that have a different number of retimes, as this would require the anchor cells. Tables 7 and 8 show the example behavior and the example pins (also referred to as terminals) associated with the anchor cells and the retime cells during the DPC stage.

TABLE 7

| Anchor Property | Description |
| --- | --- |
| Behavior | zo <= ai; Virtual timing element. Fixed logical boundary. |
| Pins | ai, zo, clk_res (clk_res unused) |

TABLE 8

| Retime Property | Description |
| --- | --- |
| Behavior | zo <= ai; Virtual timing element. Specifies the number of stages per cone, used for the timing test and constraints generation |
| Pins | ai, zo, clk_res (clk_res unused) |

During the logical equivalence checking (LEC) stage, anchor cells are treated as flip-flops. LEO tool may check anchor-to-anchor logical equivalence and input/output terminals to/from anchor cells. The retime cells are treated as pass through during this stage, Tables 9 and 10 show the example behavior and the example pins (also referred to as terminals) associated with the anchor cells and the retime cells during the LEC stage.

TABLE 9

| Anchor Property | Description |
| --- | --- |
| Behavior | always @(posedge clk_res) zo <= ai; Flop at clk_res |
| Pins | ai, zo, clk_res |
| Library | Same as synthesis Library. |

TABLE 10

| Retime Property | Description |
| --- | --- |
| Behavior | zo <= ai; Transparent, pass through |
| Pins | ai, zo, clk_res (clk_res unused) |
| Library | Buffer Library |

During the pulse timing stage, both the anchor cells and the retime cells may be treated as virtual timing elements. All phase information may be embedded in the surrounding logic. In this example, the virtual elements may be placed directly preceding the cell where the phase transition to zero resides. The pulse timing tool will validate that all pulses propagate and meet arrival windows at the destination Josephson junction, Tables 11 and 12 show the example behavior and the example pins (also referred to as terminals) associated with the anchor cells and the retime cells during the pulse timing stage.

TABLE 11

| Anchor Property | Description |
| --- | --- |
| | zo <= ai; Has no internal delay. Serves as a marker for the start/end points of timing paths. Will cause setup requirements to be created at a following component. |

TABLE 11-continued

| Anchor Property | Description |
|---|---|
| Pins | ai, zo, clk_res |
| Library | Zero delay |

TABLE 12

| Retime Property | Description |
|---|---|
| Behavior | zo <= ai; Transparent, pass through. |
| Pins | ai, zo, clk_res |
| Library | Zero delay |

During the WPL stage timing, anchor cells may behave as flip-flops. The multi-cycle constraints (provided by the DPC) may be applied to constrain both the anchor-to-anchor timing paths and the input/output terminal to/from anchor cells. The WPL stage timing tool may check to ensure that the number of retimes between the anchor cells in the netlist is equal to those provided as an input to the DPC. During the WPL stage timing, the retime cells may incur a unit delay. All other cells may have a zero delay. Tables 13 and 14 show the example behavior and the example pins (also referred to as terminals) associated with the anchor cells and the retime cells during the WPL stage timing.

TABLE 13

| Anchor Property | Description |
|---|---|
| Behavior | ff(zo) { clocked_on : clk_res ; next_state : ai} |
| Pins | ai, zo, clk_res |

TABLE 14

| Retime Property | Description |
|---|---|
| Behavior | zo <= #1 ai; |
| Pins | ai, zo, clk_res (clk_res unused) |
| Library | Delay = 1 |

Figure 3:
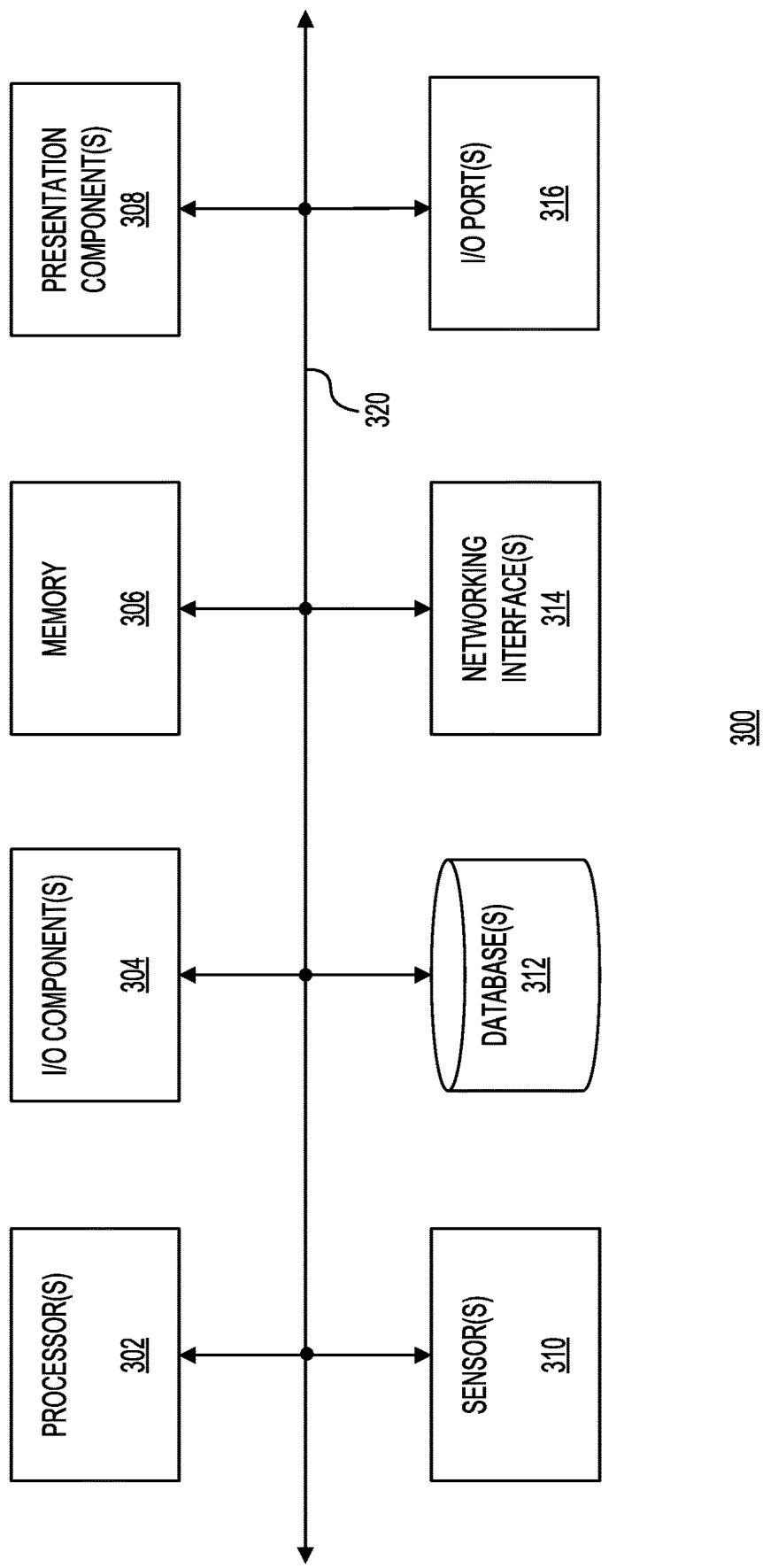
FIG. 3 shows a computing platform that may be used to implement the functions associated with methods related to superconducting circuit design including virtual timing elements in accordance with one example.

FIG. 3 shows a computing platform 300 that may be used to implement the functions associated with methods related to superconducting circuit design 200 including virtual timing elements in accordance with one example. FIG. 3 shows a computing platform 300 that may be used to implement the functions associated with the various methods related to virtual timing elements. Computing platform 300 may include processor(s) 302, I/O component(s) 304, memory 306, presentation component(s) 308, sensor(s) 310, database(s) 312, networking interface(s) 314, and I/O port(s) 316, which may be interconnected via bus 320. Processor(s) 302 may execute instructions or code stored in memory 306. The instructions may correspond to the various modules and algorithms described in the present disclosure. Thus, the modules and algorithms may be implemented using a programming language and compiled into executables, which may then be executed. I/O component(s) 304 may include components such as a keyboard, a mouse, a voice recognition processor, or touch screens. Memory 306 may be any combination of non-volatile storage or volatile storage (e.g., flash memory, DRAM, SRAM, or other types of memories). Presentation component(s) 308 may be any type of display, such as LCD, LED, or other types of display, or other types of output components, including audio or haptic output components. Sensor(s) 310 may include audio sensors, optical sensors, or other types of sensors.

With continued reference to FIG. 3, database(s) 312 may be used to store superconducting design related information, including the design related information for anchor cells and retime cells, the timing library, and other design related information. Networking interface(s) 314 may include communication interfaces, such as Ethernet, cellular radio, Bluetooth radio, UWB radio, or other types of wireless or wired communication interfaces. I/O port(s) 316 may allow computing platform 300 to communicate with bus 320 or other I/O component(s) 304. Although FIG. 3 shows computing platform 300 as including a certain number of components arranged and coupled in a certain way, it may include fewer or additional components arranged and coupled differently. In addition, the functionality associated with computing platform 300 may be distributed or combined, as needed. Moreover, not all of the aspects of computing platform 300 may be needed to implement the various methods, modules, and algorithms described herein.

Figure 4:
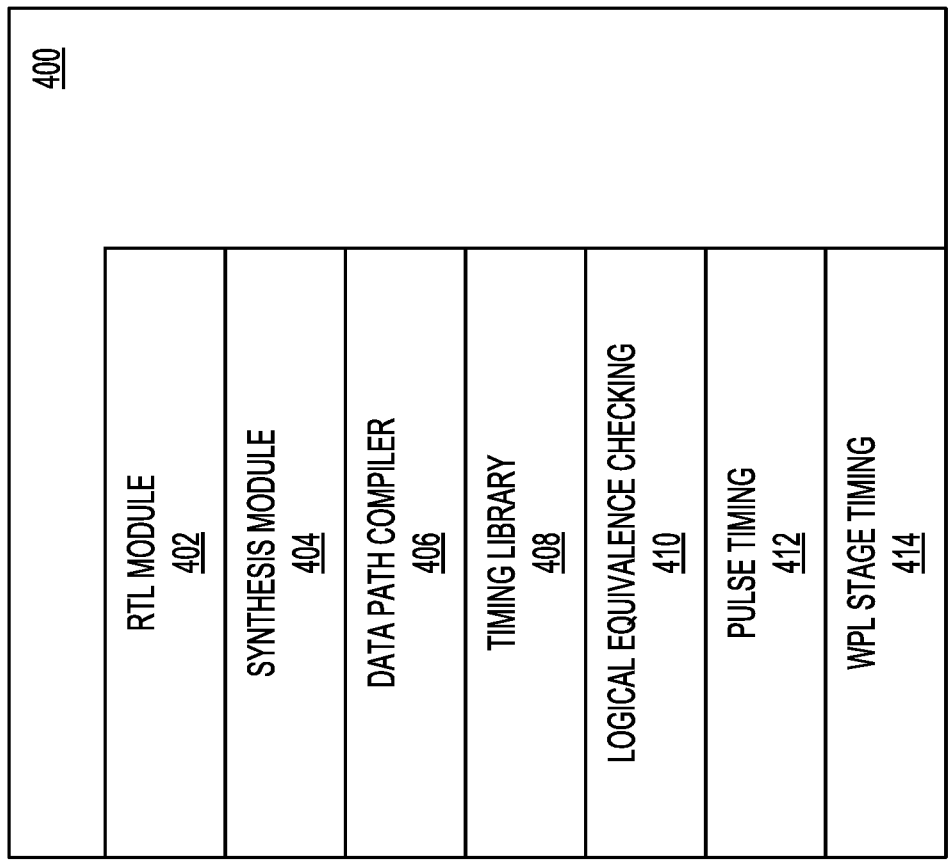
FIG. 4 shows example modules including instructions stored in a memory associated with the computing platform of FIG. 3.

FIG. 4 shows example modules including instructions stored in a memory 400 (e.g., memory 306 of FIG. 3) associated with the computing platform of FIG. 3. Memory 400 may include instructions corresponding to an RTL module 402, a synthesis module 404, a data path compiler 406, a timing library 408, a logical equivalence checking (LEO) 410, pulse timing 412, and WPL stage timing 414. RTL module 402 may include instructions that when executed by processor(s) 302 of FIG. 3 may allow a designer to specify a WPL design in a hardware description language, such as RTL and provide the designer a method to trade off verboseness with performance. In one example, RTL module 402 may include instructions shown in Table 15.

TABLE 15

```
module wpl_stg
    #(parameter STG = 1, //Number of stages (including ANCHOR)
        parameter ANCHOR = 1, //0:front, 1:end
        parameter WIDTH = 1)
    (
        input clk_res,
        input [WIDTH-1:0] ai,
        output [WIDTH-1:0] zo
    );
    wire [WIDTH-1:0] w[STG:0];
    assign w[0] = ai;
    assign zo = w[STG];
    genvar i, j;
    generate
```

TABLE 15-continued

```
      for (j=0; j<WIDTH; j=j+1) begin : wpl_w
        for (i=0; i<STG; i=i+1) begin : wpl_stgs
          if( (i==0 & ANCHOR==0) | (i==(STG-1) & ANCHOR==1) ) begin:a
            w_anchor anchor
              (.clk_res(clk_res),
               .ai(w[i][j]),
               .zo(w[i+1][j]));
          end else begin:r
            w_retime retime
              (.clk_res(clk_res),
               .ai(w[i][j]),
               .zo(w[i+1][j]));
          end
        end
      end
    endgenerate
endmodule
```

The wpl_stg module included as part of RTL module 402 may allow a designer of a superconducting circuit to instantiate, or call out, methods and related data structures corresponding to anchor cells and retime cells. In this example, parameters associated with the wpl_stg module are listed and described in Table 16 below.

TABLE 16

| Parameter | Description |
|---|---|
| STG | Number of stages, including both retime cells and anchor cells. There is always one anchor in each stage. |
| ANCHOR | Position of the Anchor cell in the stage chain. 0: Anchor cell is first, followed by retime cells 1: Anchor cell is on the end. Retime cells first. |
| WIDTH | Width in bits of the staging pipeline. |

Synthesis module 404 may perform functions described earlier h respect to the synthesis stage. Data path compiler 406 may perform functions described earlier with respect to the DPC stage. Timing library 408 may include information concerning frequency, AC amplitude, and other parameters concerning the type of logic gates that are associated with the design. As an example, the logic gates may correspond to wave pipelined logic gates. In this example, timing library may include Json and Verilog definitions of the logic gates. These definitions may include rise/fall tables that coincide with clocks, and signal types (return to zero/non-return to zero, etc.). In one example, these definitions may be properties in the Verilog for gates. Logical equivalence checking 410 may perform functions described earlier with respect to the logical equivalence stage. Pulse timing 412 may perform functions described earlier with respect to the pulse timing stage. WPL stage timing 414 may perform functions described earlier with respect to the WPL stage timing 414. Additional details concerning the functions performed by the instructions stored in memory 400 are provided with respect to the methods described later. Although FIG. 4 shows a certain number and type of modules, there may be additional or fewer modules that may be configured differently. As an example, additional timing libraries may be included with similar information that could be used to support superconducting circuits built for operation at different temperatures or superconducting circuits built using different manufacturing processes.

Figure 5:
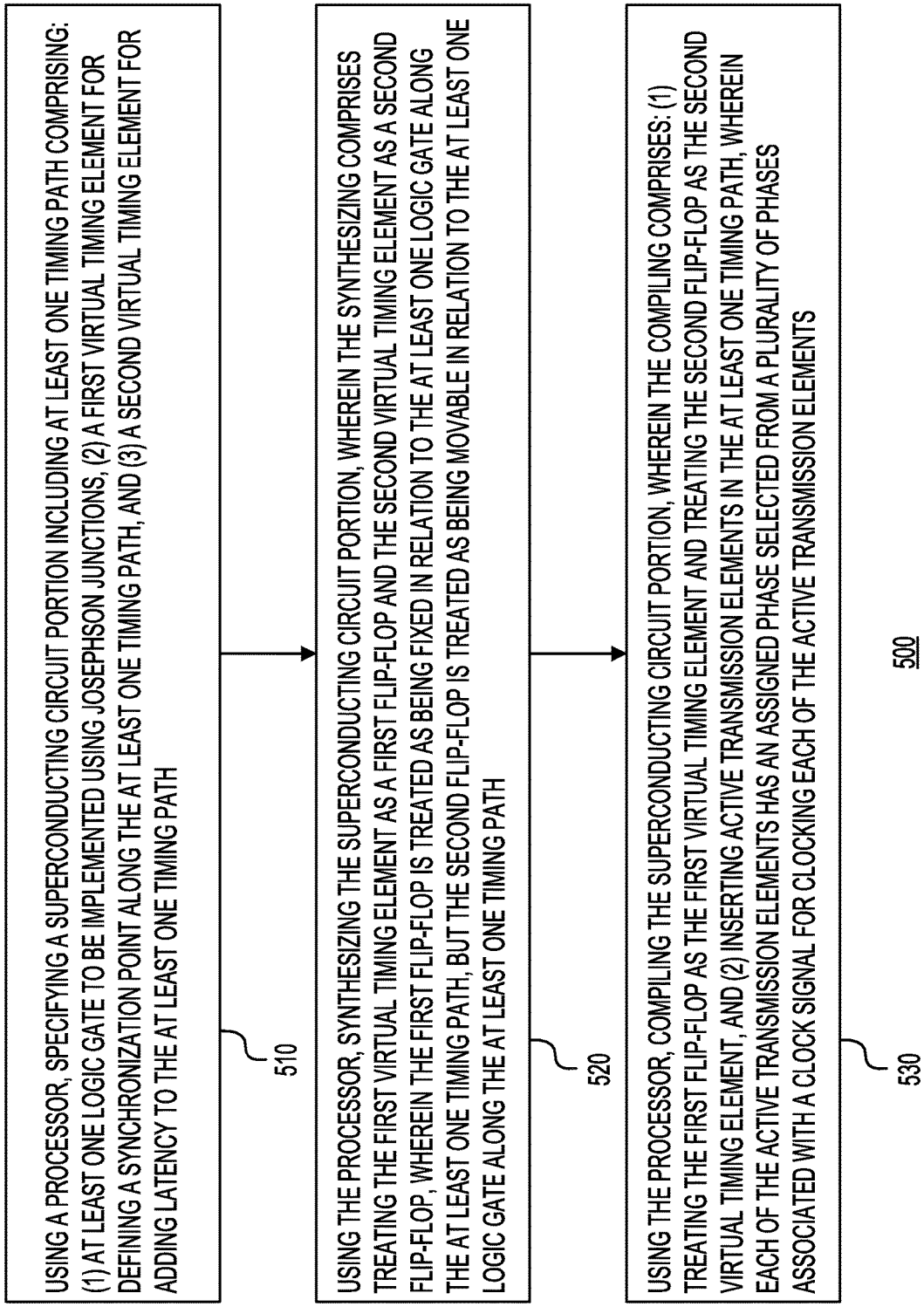
FIG. 5 is a flow chart of a method related to superconducting circuit design in accordance with one example.

FIG. 5 is a flow chart 500 of a method related to superconducting circuit design in accordance with one example. In this example, the various steps recited as part of flow chart 500 may be performed by the various modules described earlier with respect to FIG. 4, when instructions corresponding to these modules are executed by a processor (e.g., processor(s) 302 of FIG. 3). Step 510 may include, using the processor, specifying a superconducting circuit portion including at least one timing path comprising (1) at least one logic gate to be implemented using Josephson junctions, (2) a first virtual timing element for defining a synchronization point along the at least one timing path, and (3) a second virtual timing element for adding latency to the at least one timing path. In one example, instructions corresponding to at least RTL module 402, when executed by a processor (e.g., processor(s) 302 of FIG. 3), may perform this step.

Figure 6:
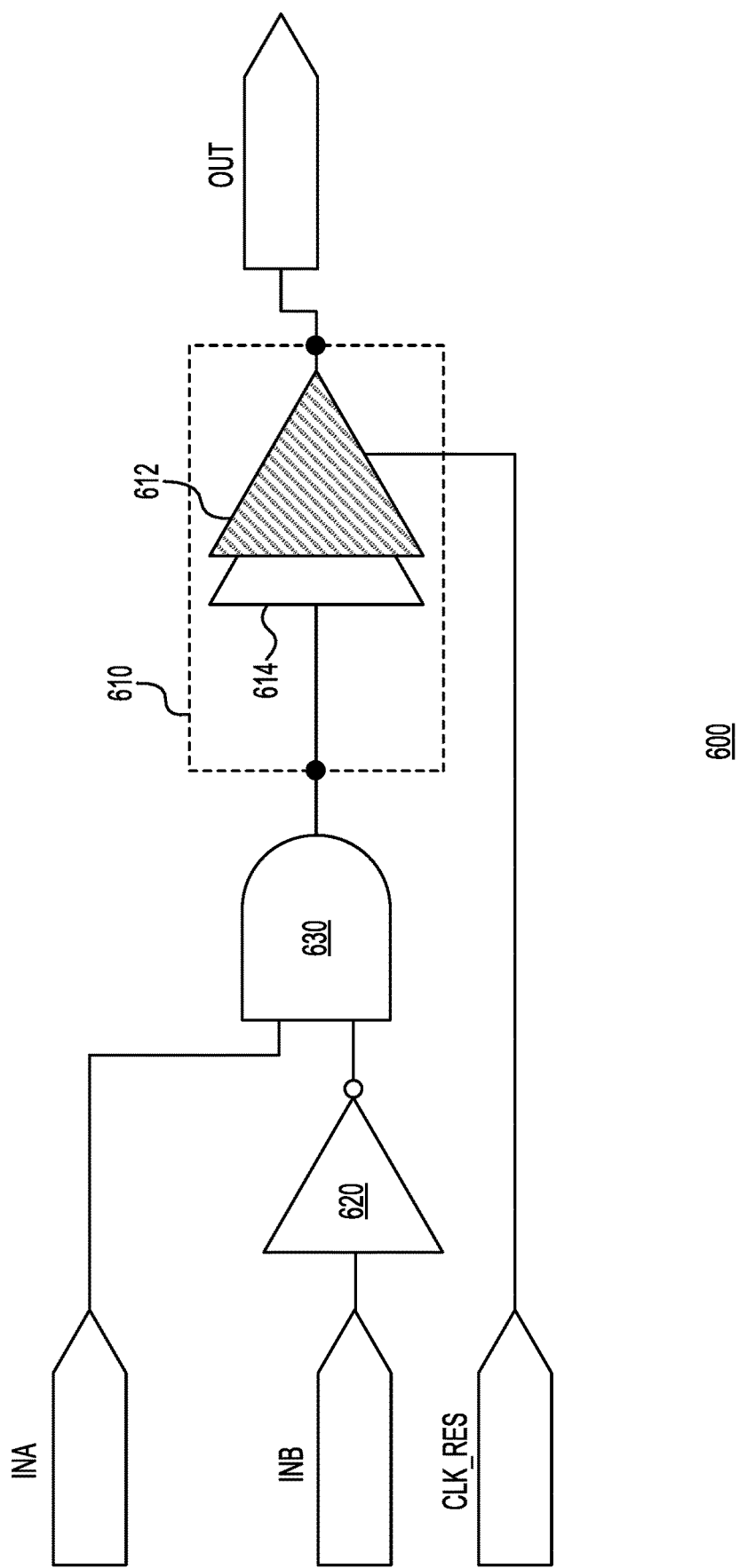
FIG. 6 shows a diagram of an example superconducting circuit portion during a design stage to illustrate the method of FIG. 5 in accordance with one example.

FIG. 6 shows a diagram of an example superconducting circuit portion 600 during the RTL design stage to illustrate step 510 of the method of FIG. 5. Superconducting circuit portion 600 may include a WPL stage 610, which may include an anchor cell 612 and a retime cell 614. Superconducting circuit portion 600 may further include two input terminals (INA and INB), an output terminal (OUT) and a clock terminal (CLK_RES). Input terminal INA may be coupled to one of the inputs of an AND gate 630. Input terminal INB may be coupled to the input of an inverter 620. The output of inverter 620 may be coupled to the other input of AND gate 630. WPL stage 610 may be coupled to the output of AND gate 630. The output of WPL stage 610 may be coupled to the output terminal (OUT). Using a design tool (e.g., RTL module 402), a designer may instantiate anchor cell 612 and retime cell 614 to define the number of cycles in the superconducting circuit portion being designed. A timing path may correspond to a connected set of components in the superconducting circuit portion. Thus, in FIG. 6, a timing path may include the input terminal (INA), AND gate 630, WPL stage 610, and the output terminal (OUT). Another timing path may include the input terminal (INB), inverter 620, AND gate 630, WPL stage 610, and the output terminal (OUT). In this example, anchor cell 612 may define a cycle boundary. In this example, anchor cell 612 may define a synchronization point along a timing path including AND gate 630 and along a timing path including inverter 620 and gate 630. Retime cell 614 may add a latency to the timing paths. AND gate 630 and inverter 620 may be implemented using Josephson junctions for use as part of the superconducting circuit. Although FIG. 6 shows a specific number and type of components arranged in a certain manner, superconducting circuit portion 600 may include additional or fewer components that may be of other types and that may be arranged differently.

Step 520 may include, using the processor, synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the at least one timing path, but the second flip-flop is treated as being movable in relation to the at least one logic gate along the at least one timing path. In this example, this step may be performed by instructions corresponding to synthesis module 404, when executed by a processor (e.g. processor(s) 302 of FIG. 3).

Figure 7:
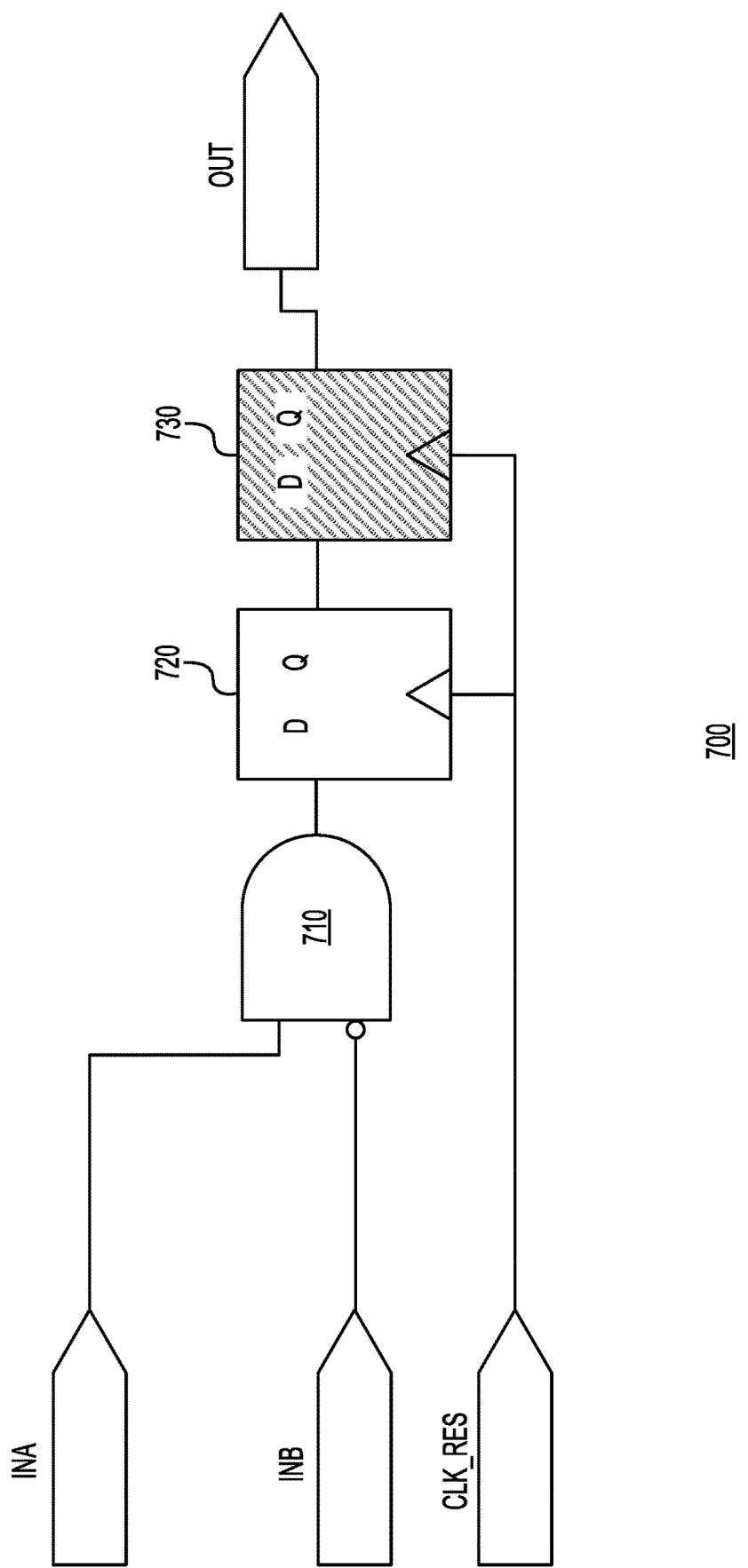
FIG. 7 shows a diagram of an example superconducting circuit portion during a design stage to illustrate the method of FIG. 5 in accordance with one example.

FIG. 7 shows a diagram of an example superconducting circuit portion 700 during the synthesis stage to illustrate step 520 of the method of FIG. 5. Superconducting circuit portion 700 may include two input terminals (INA and INB), an output terminal (OUT) and a clock terminal (CLK_RES). These terminals may correspond to similar terminals described earlier with respect to FIG. 6. Input terminal INA may be coupled to one of the inputs of an A-and-not-B gate 710. Input terminal INB may be coupled to the other input of A-and-not-B gate 710. During the synthesis stage, the virtual timing elements may be treated as flip-flops. Thus, retime cell 614 (one of the virtual timing elements) may be treated as a flip-flop 720 and anchor cell 612 (another one of the virtual timing elements) may be represented as a flip-flop 730. The output of flip-flop 720 may be coupled to the input of flip-flop 730. Each of the flip-flops may further receive the clock signal via the clock (e.g., the CLK_RES terminal) terminal. The output of flip-flop 730 may be coupled to the output terminal.

Step 530 may include, using the processor, compiling the superconducting circuit portion, where the compiling comprises: (1) treating the first flip-flop as the first virtual timing element and treating the second flip-flop as the second virtual timing element, and (2) inserting active transmission elements in the at least one timing path, where each of the active transmission elements has an assigned phase selected from a plurality of phases associated with a clock signal for clocking each of active transmission elements. In one example, instructions corresponding to at least data path compiler 406, when executed by a processor (e.g., processor(s) 302 of FIG. 3), may perform this step.

Figure 8:
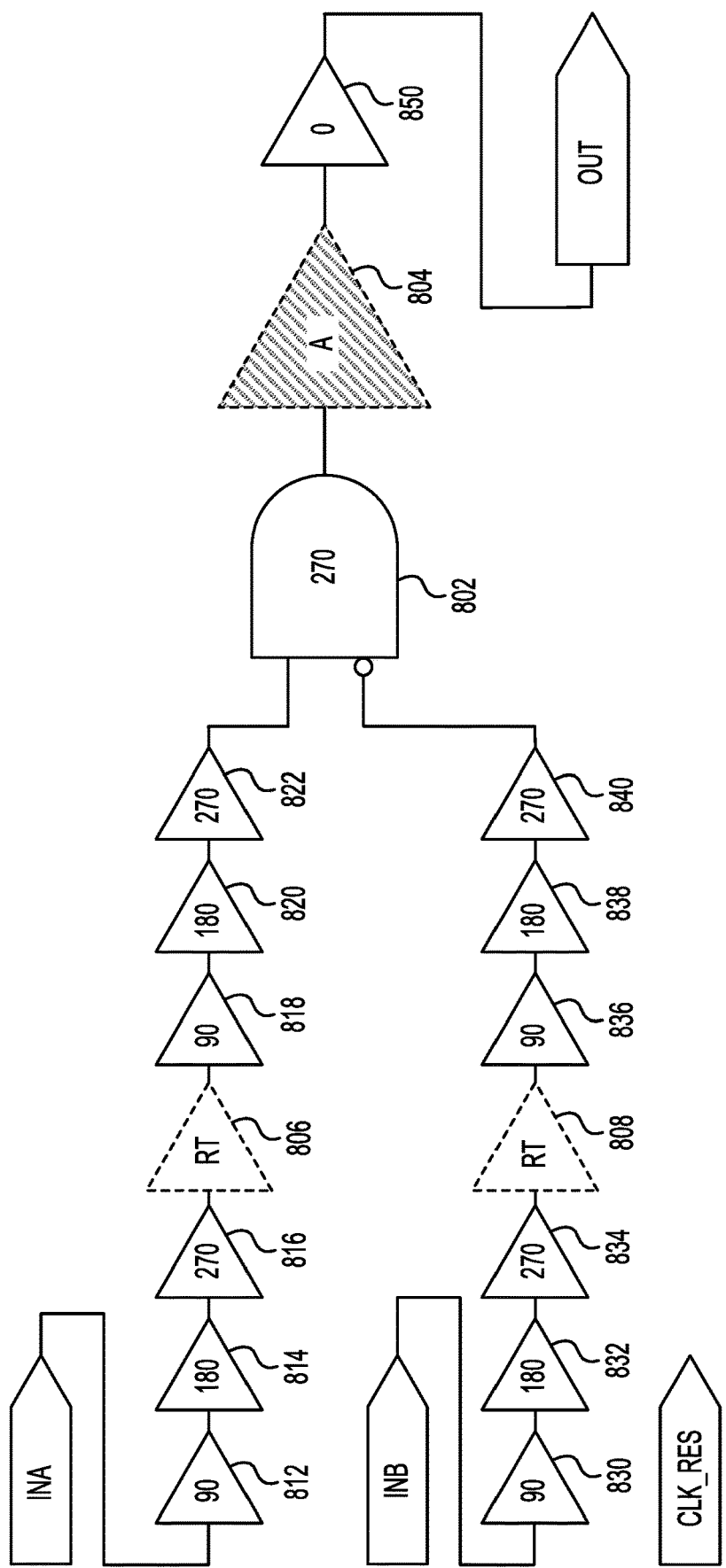
FIG. 8 shows a diagram of an example superconducting circuit portion during a design stage to illustrate the method of FIG. 5 in accordance with one example.

FIG. 8 shows one example of a superconducting circuit portion 800 to illustrate this step. Superconducting circuit portion 800 includes similar input terminals (INA and INB), an output terminal (OUT) and a clock terminal (CLK_RES) as described earlier. At this stage of processing, anchor cell 804 and retime cells 806 and 808 are treated as virtual timing elements. Superconducting circuit portion 800 further includes A-and-not-B gate 802, which may be implemented using Josephson junctions and inductors, as needed. Although not shown, the clock signal, which may be used to power the JJs associated with A-and-not-B gate, may be coupled to the JJs via transformer couplings and other mechanisms, Superconducting circuit portion 800 further includes active transmission elements 812, 814, 816, 818, 820, and 822, which are included as part of the portion of the timing path leading up to the input of A-and-not-B gate 802. Superconducting circuit portion 800 further includes active transmission elements 830, 832, 834, 836, 838, and 840, which are included as part of the portion of the timing path leading up to the other input of A-and-not-B gate 802, Each of the active transmission elements may be assigned a phase associated with the clock signal. As an example, when the clock signal has four phases—0 degrees, 90 degrees, 180 degrees, and 270 degrees—each of the active transmission elements may be assigned one of these phases. In addition, A-and-not-B gate 802 may also be assigned a phase (e.g., a phase of 270 degrees) in this example, Another active transmission element 850 may be coupled between anchor cell 804 and the output terminal. The anchor cell 804 may be placed at the transition of the phase from 270 degrees to 0 degrees. In this example, no phase is assigned to the virtual timing elements (e.g., anchor cell 804 and retime cells 806 and 808); instead their phase is inferred from the surrounding logic (e.g., the phase allocation to the active transmission elements).

Although FIG. 5 shows a certain number of steps being performed in a certain order, the method may include more or fewer steps performed in a different order. As an example, another method may include an additional step of optimizing the logic.

In conclusion, the present disclosure relates to a method, implemented by a processor, including using the processor, specifying a superconducting circuit portion including at least one timing path comprising: (1) at least one logic gate to be implemented using Josephson junctions, (2) a first virtual timing element for defining a synchronization point along the at least one timing path, and (3) a second virtual timing element for adding latency to the at least one timing path. The method may further include using the processor, synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the at least one timing path, but the second flip-flop is treated as being movable in relation to the at least one logic gate along the at least one timing path.

The synchronization point may be configured to allow logical equivalence during design of the superconducting circuit. The first virtual timing element may be implemented using an anchor cell. The second virtual timing element may be implemented using a retime cell. The first virtual timing element may be implemented as a property of a timing pin associated with the at least one timing path. The second virtual timing element may be implemented as a property of a timing pin associated with the at least one timing path. The superconducting circuit may be configured to process wave pipelined logic type of signals.

In another aspect, the present disclosure relates to a superconducting circuit having a first input terminal, a second input terminal, an output terminal, and a clock terminal configured to receive a clock signal. The superconducting circuit may include a first timing path comprising a first active transmission element coupled between the first input terminal and a first virtual timing element. The superconducting circuit may further include a second timing path comprising a second active transmission element coupled between the second input terminal and a second virtual timing element. The superconducting circuit may further include a logic gate coupled to: (1) receive a first signal via the first input terminal and (2) receive a second signal via the second input terminal, where, based on the first signal and the second signal, the logic gate is further configured to provide an output signal. The superconducting circuit may further include a third virtual timing element coupled to receive the output signal and couple the output signal to the output terminal, where the first virtual timing element is configured to add a first latency to the first timing path and the second virtual timing element is configured to add a second latency to the second timing path, and where the third virtual timing element is configured to allow logical equivalence testing during design of the superconducting circuit.

Each of the first active transmission element and the second active transmission element may be clocked using a clock signal having a plurality of phases. The plurality of phases may comprise a 0 degrees phase, a 90 degrees phase, a 180 degrees phase, and a 270 degrees phase, and the third virtual timing element may be located at a first zero crossing point associated with the clock signal. The first virtual timing element may be located at a second zero crossing point associated with the clock signal. The second virtual timing element may be located at a third zero crossing point associated with the clock signal. The third virtual timing element may define a synchronization point for the first timing path and the second timing path.

In yet another aspect, the present disclosure relates to a method, implemented by a processor, including using the processor, specifying a superconducting circuit portion including at least one timing path comprising: (1) at least one logic gate to be implemented using Josephson junctions, (2) a first virtual timing element for defining a synchronization point along the at least one timing path, and (3) a second virtual timing element for adding latency to the at least one timing path. The method may further include using the processor, synthesizing the superconducting circuit portion, where the synthesizing comprises treating the first virtual timing element as a first flip-flop and the second virtual timing element as a second flip-flop, where the first flip-flop is treated as being fixed in relation to the at least one logic gate along the at least one timing path, but the second flip-flop is treated as being movable in relation to the at least one logic gate along the at least one timing path. The method may further include using the processor, compiling the superconducting circuit portion, where the compiling comprises: (1) treating the first flip-flop as the first virtual timing element and treating the second flip-flop as the second virtual timing element, and (2) inserting active transmission elements in the at least one timing path, where each of the active transmission elements has an assigned phase selected from a plurality of phases associated with a clock signal for clocking each of active transmission elements.

The synchronization point may be configured to allow logical equivalence during design of the superconducting circuit. The first virtual timing element may be implemented using an anchor cell. The second virtual timing element may be implemented using a retime cell. The first virtual timing element may be implemented as a property of a timing pin associated with the at least one timing path. The second virtual timing element may be implemented as a property of a timing pin associated with the at least one timing path. The plurality of phases may comprise a 0 degrees phase, a 90 degrees phase, a 180 degrees phase, and a 270 degrees phase, and wherein the first virtual timing element is located at a first zero crossing point associated with the clock signal.

It is to be understood that the methods, modules, and components depicted herein are merely exemplary, Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor(s) 402. Example transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, comprising:
using the processor, specifying a superconducting circuit portion including at least one timing path comprising:

(1) at least one logic gate to be implemented using Josephson junctions, (2) a first virtual timing element for defining a synchronization point along the at least one timing path, wherein the first virtual timing element is implemented using an anchor cell configured to specify a fixed boundary in a logic cone associated with the superconducting circuit portion, and (3) a second virtual timing element for adding latency to the at least one timing path, wherein the second virtual timing element is implemented using a retime cell; and using the processor, synthesizing the superconducting circuit portion, wherein the synthesizing comprises treating the first virtual timing element as a first flip-flop and the second virtual timing element as a second flip-flop, wherein the first flip-flop is treated as being fixed in relation to the at least one logic gate along the at least one timing path, but the second flip-flop is treated as being movable in relation to the at least one logic gate along the at least one timing path.

2. The method of claim 1, wherein the synchronization point is configured to allow logical equivalence during design of the superconducting circuit.

3. The method of claim 1, wherein the first virtual timing element is implemented as a property of a timing pin associated with the at least one timing path.

4. The method of claim 1, wherein the second virtual timing element is implemented as a property of a timing pin associated with the at least one timing path.

5. The method of claim 1, wherein the superconducting circuit is configured to process wave pipelined logic type of signals.

6. The method of claim 1, wherein the fixed boundary comprises a cycle boundary corresponding to a zero-crossing associated with a clock signal used for clocking the superconducting circuit portion.

7. The method of claim 1, wherein the retime cell is configured to specify a cycle boundary associated with the superconducting circuit portion.

8. A superconducting circuit having a first input terminal, a second input terminal, an output terminal, and a clock terminal configured to receive a clock signal, the superconducting circuit comprising:
a first timing path comprising a first active transmission element coupled between the first input terminal and a first virtual timing element, wherein the first virtual timing element is implemented using an anchor cell configured to specify a fixed boundary in a logic cone associated with the superconducting circuit;
a second timing path comprising a second active transmission element coupled between the second input terminal and a second virtual timing element, wherein the second virtual timing element is implemented using a retime cell;
a logic gate coupled to: (1) receive a first signal via the first input terminal and (2) receive a second signal via the second input terminal, wherein, based on the first signal and the second signal, the logic gate is further configured to provide an output signal;
a third virtual timing element coupled to receive the output signal and couple the output signal to the output terminal, wherein the first virtual timing element is configured to add a first latency to the first timing path and the second virtual timing element is configured to add a second latency to the second timing path, and wherein the third virtual timing element is configured to allow logical equivalence testing during design of the superconducting circuit.

9. The superconducting circuit of claim 8, wherein each of the first active transmission element and the second active transmission element is clocked using a clock signal having a plurality of phases.

10. The superconducting circuit of claim 9, wherein the plurality of phases comprises a 0 degrees phase, a 90 degrees phase, a 180 degrees phase, and a 270 degrees phase, and wherein the third virtual timing element is located at a first zero crossing point associated with the clock signal.

11. The superconducting circuit of claim 10, wherein the first virtual timing element is located at a second zero crossing point associated with the clock signal.

12. The superconducting circuit of claim 11, wherein the second virtual timing element is located at a third zero crossing point associated with the clock signal.

13. The superconducting circuit of claim 8, wherein the third virtual timing element defines a synchronization point for the first timing path and the second timing path.

14. A method, implemented by a processor, the method comprising:
using the processor, specifying a superconducting circuit portion including at least one timing path comprising: (1) at least one logic gate to be implemented using Josephson junctions, (2) a first virtual timing element for defining a synchronization point along the at least one timing path, wherein the first virtual timing element is implemented using an anchor cell configured to specify a fixed boundary in a logic cone associated with the superconducting circuit, and (3) a second virtual timing element for adding latency to the at least one timing path, wherein the second virtual timing element is implemented using a retime cell;
using the processor, synthesizing the superconducting circuit portion, wherein the synthesizing comprises treating the first virtual timing element as a first flip-flop and the second virtual timing element as a second flip-flop, wherein the first flip-flop is treated as being fixed in relation to the at least one logic gate along the at least one timing path, but the second flip-flop is treated as being movable in relation to the at least one logic gate along the at least one timing path; and
using the processor, compiling the superconducting circuit portion, wherein the compiling comprises: (1) treating the first flip-flop as the first virtual timing element and treating the second flip-flop as the second virtual timing element, and (2) inserting active transmission elements in the at least one timing path, wherein each of the active transmission elements has an assigned phase selected from a plurality of phases associated with a clock signal for clocking each of active transmission elements.

15. The method of claim 14, wherein the synchronization point is configured to allow logical equivalence during design of the superconducting circuit.

16. The method of claim 14, wherein the first virtual timing element is implemented as a property of a timing pin associated with the at least one timing path.

17. The method of claim 14, wherein the second virtual timing element is implemented as a property of a timing pin associated with the at least one timing path.

18. The method of claim 14, wherein the plurality of phases comprises a 0 degrees phase, a 90 degrees phase, a 180 degrees phase, and a 270 degrees phase, and wherein the first virtual timing element is located at a first zero crossing point associated with the clock signal.

19. The method of claim 14, wherein the fixed boundary comprises a cycle boundary corresponding to a zero-crossing associated with the clock signal.

20. The method of claim 14, wherein the retime cell is configured to specify a cycle boundary associated with the superconducting circuit portion.

* * * * *